United States Patent [19]

Levy-Navarro et al.

[11] Patent Number: 4,547,764
[45] Date of Patent: Oct. 15, 1985

[54] PULSE WIDTH DECODER FOR DOUBLE FREQUENCY ENCODED SERIAL DATA

[75] Inventors: Bernardo Levy-Navarro, Ann Arbor, Mich.; Ensi P. Sylvernale, West Chester, Pa.

[73] Assignee: Burroughs Corporation, Detroit, Mich.

[21] Appl. No.: 547,382

[22] Filed: Oct. 31, 1983

[51] Int. Cl.⁴ ............................................. H03K 13/24
[52] U.S. Cl. ............................. 340/347 DD; 375/110
[58] Field of Search ................. 340/347 DD; 360/40, 360/41, 42, 43, 44, 45; 375/87, 110; 329/107

[56] References Cited

U.S. PATENT DOCUMENTS

| | | | |
|---|---|---|---|
| 3,237,176 | 2/1966 | Jenkins | 360/43 |
| 3,448,445 | 6/1969 | Vallee | 340/347 DD |
| 4,320,525 | 3/1982 | Woodward | 375/87 |
| 4,344,039 | 8/1982 | Sugiura | 375/110 |

OTHER PUBLICATIONS

Brown, "IBM Technical Disclosure Bulletin", vol. 21, No. 11, Apr. 1979, pp. 4611–4613.

Primary Examiner—Charles D. Miller
Attorney, Agent, or Firm—Mark T. Starr; Kevin R. Peterson

[57] ABSTRACT

Disclosed is a pulse width decoder which receives a double frequency modulated (DFM) waveform and recovers therefrom the contained NRZ-L data and clock information. Basically, the decoder looks for long and short pulses in the DFM waveform. A long pulse is decoded as a "0", while a pair of short, opposite polarity pulses are decoded as a "1". In addition, in order to allow for pulse shortening in the DFM waveform, a short pulse followed by a long pulse is interpreted as a "1". The clock signal is primarily derived from two delayed versions of the DFM waveform to create one clock edge every bit time.

18 Claims, 6 Drawing Figures

PULSE WIDTH DECODER FOR DOUBLE FREQUENCY ENCODED SERIAL DATA

BACKGROUND OF THE INVENTION

Serial digital data is frequently transmitted using a self-clocking encoding. The basic idea behind these self-clocking codes is to guarantee that a certain minimum number of digital "events" (pulses or transitions in level) occur within the digital waveform. These "guaranteed" events can then be used to establish and reconstruct frequency and phase of the clocking signals which were used to encode and transmit the data.

"Double frequency modulation" encoding is the simplest of the self-clocked encodings. It is characterized by a guarantee that at least one, but no more than two digital events occur per bit cell in the digital waveform. A bit cell is that portion of the waveform which is generated by one cycle of the basic digital clock and contains a single binary "0" or binary "1". The presence or absence of the second (non-guaranteed) event depends upon the data being encoded.

Double frequency modulation (DFM) is referred to in the prior art as biphase-mark, frequency modulation (FM), diphase, and frequency shift code (FSC).

A DFM encoded waveform contains pulses of two widths, long and short. A long pulse is twice the width of a short pulse. Pulse width is defined as the time between two transitions or edges. DFM waveforms alternate between positive and negative pulses.

The DFM encoding algorithm is quite simple. A sequence of two short adjacent pulses of opposite polarity represents a logical "1" (or "mark"), while a long pulse of either polarity represents a logical "0" (or "space"). DFM encoding may also be characteirzed by the edges or transitions in the encoded waveform. A transition occurs at the start of every bit cell. A "1" has an additional transition in the middle of the bit cell. A "0" does not have any mid-cell transition. Another way of looking at the encoding is that a "0" is encoded as a low frequency element, while a "1" is encoded as a high frequency element; hence the name double frequency modulation.

Recovering data and clock information from a DFM waveform depends on the ability to recognize the guaranteed transitions and to synchronize some timing circuit with these recognized guaranteed transitions. The output of the timing circuit can then be used, along with some additional logic, to extract data from the waveform. In the prior art, various timing circuits have been used for this purpose. Two commonly used techniques are briefly discussed below.

In the prior art technique, monostable multivibrators triggered by the guaranteed transitions define a "window" during an interval when a non-guaranteed transition may occur. The pulses produced by the monostables are then used to extract data from the waveform. Technique 1 has the advantage of simplicity, but suffers from wide variations in timing common with monostables. Further, technique 1 is quite susceptible to spurious operation induced by noise in the incoming waveform and is limited to usage with relatively low frequency signals.

In the second prior art technique, a variable frequency oscillator is synchronized to the incoming frequency by means of a phase-locked loop. The output of the oscillator is then used to extract data from the incoming waveform. Technique 2 eliminates the timing tolerance problem associated with technique 1 and is much less prone to noise induced failure. However, technique 2 is substantially more complex than technique 1. When working at high data rates (on the order of 100 Mb/s or higher) there can be problems obtaining cost effective phase-locked loops that have the proper parameters. In addition, a continuous bit stream of approximately forty or more bits is needed to lock the phase-locked loop onto the desired frequency.

In certain applications where units containing circuits exemplified by techniques 1 to 2 are placed in series, such as in a ring network, the clocking signals derived from the incoming waveform are used to construct an outgoing waveform for transmission to the next unit downline. In such a configuration, "jitter" (viz., timing uncertainty) in the output waveform must be minimized since the jitter may cascade and be amplified by passage through several units in series. Phase-locked loops, such as those of technique 2, always exhibit frequency jitter. The amount of jitter is traded off against capture time (time to go from initial "unlocked" state to "locked") and lock range (input frequency range within which the phase-locked loop will eventually enter the locked condition). Since less jitter means less tracking ability and hence greater sensitivity to component value tolerances, technique 2 may be unsuitable for applications in which many units, each containing the extraction circuit, are cascaded in series. Using technique 1 it is possible to design a circuit which exhibits no jitter beyond that present in the incoming waveform, but one that suffers from the aforementioned drawbacks.

Previous efforts have been made to overcome the above discussed drawbacks of the prior art. For example, in U.S. Pat. Nos. 4,313,206 and 4,320,525 both of which are assigned to the same assignee as the present invention, circuits are disclosed for reconstructing the timing information encoded in a double frequency transition event waveform. However, neither of these techniques provides for recovering the encoded data information. In addition, these prior art techniques are designed to handle waveforms having a frequency of 1 MHz. In contrast, some present and many planned communications systems must be capable of operating at speeds exceeding 100 MHz.

OBJECTS OF THE INVENTION

It is a general object of the present invention to overcome these and other drawbacks of the prior art by providing an improved pulse width decoder for double frequency encoded serial data.

It is a further object of the present invention to provide a decoder which derives clock and data (NRZ-L) information from a double frequency encoded serial data bit stream.

It is another object of the present invention to provide a pulse width decoder for a double frequency modulation (DFM) self-clocking waveform which does not utilize a phase-locked loop to reconstruct the clock.

It is still another object to provide a pulse width decoder for a DFM self-clocking waveform which is able to synchronize itself with the input data in two bits (given that two "0" bits are input).

It is still a further object of the present invention to provide a pulse width decoder for a DFM self-clocking waveform which operates at speeds of 100 Mb/s.

It is yet another object of the present invention to provide a decoder for a DFM self-clocking waveform which can tolerate a 34% pulse width error.

It is still a further object of the present invention to provide a pulse width decoder for a DFM self-clocking waveform which can tolerate pulse shortening in the DFM input waveform.

It is another object of the present system to provide a DFM self-clocking waveform decoder which can operate in a system employing either wire or fiber optic transmission cables.

These and other objects, features and advantages of the present invention will become more apparent from the description of the preferred embodiment of the invention when read in conjunction with the drawings.

SUMMARY OF THE INVENTION

The foregoing objects of the present invention are achieved by providing a pulse width decoder which receives a double frequency modulation (DFM) waveform and derives therefrom the contained NRZ-L data and clock information. Basically, the decoder looks for long and short pulses in the DFM waveform. A long pulse is decoded as a "0", while a pair of short, opposite polarity pulses are decoded as a "1". In addition, in order to allow for pulse shortening in the DFM input waveform, a short pulse followed by a long pulse is interpreted as a "1".

The DFM signal enters the decoder from the output of a receiver. In the preferred embodiment, the receiver includes a high speed comparator which has its input capacitively coupled to a twinax transmission cable. The raw DFM signal R output by the receiver is also passed through first and second delay means which generate respective first and second delayed versions Δ1 and Δ2 of the raw DFM signal.

The raw DFM signal R and second delayed version Δ2 drive the data recovery logic included in the decoder. The data recovery logic looks for long pulses of either polarity. It includes a first D-type flipflop (DL) which records the occurrence of negative polarity long pulses and a second D-type flipflop (DH) which records the occurrence of positive polarity long pulses. The true outputs of the DL and DH flipflops provide the D inputs to third and fourth D-type flipflops (DLL and DHL respectively), which remember which type of long pulse ("0" bit) preceded one or more pairs of short pulses ("1" bits). The false output of the DL flipflops and the true output of the DLL flipflop are OR'ed together and the result provides one input to an AND gate. The false output of the DH flipflop and the true output of the DHL flipflop are OR'ed together and the result provides the second input to the latter mentioned AND gate. The output of the AND gate provides the decoded data recovered from the DFM signal.

The first and second delayed versions (Δ1 and Δ2) of the raw DFM signal and the false outputs of each of the four flipflops drive the clock recovery logic included in the decoder. The clock signal, RCLK, is primarily derived from the first and second delayed versions (Δ1 and Δ2) of the raw DFM signal to provide one clock edge every bit time. Additional gating, responsive to the false outputs of the four flipflops, provides for formation of the clock edges at the proper time.

DETAILED DESCRIPTION OF THE PREFERRED EMBODIMENT

The present pulse width decoder circuit derives NRZ-L data and clock information from a double frequency encoded serial data bit stream. A double frequency modulation (DFM) waveform (FIG. 1) drives the decoder. DFM waveforms are well known in the prior art, also being referred to as biphase-mark, frequency modulation (FM), diphase, or frequency shift code (FSC) waveforms.

Figure 1:
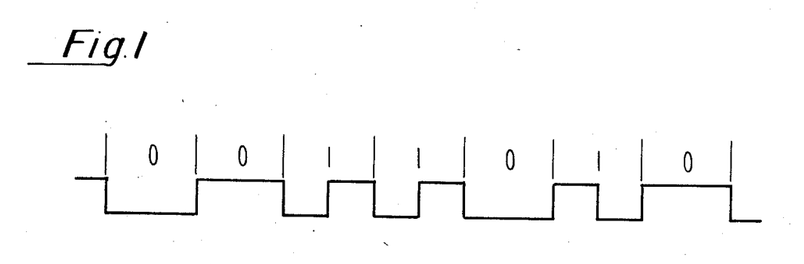
FIG. 1 shows the double frequency modulation (DFM) waveform which enters the decoder from the output of the receiver.

The DFM phase code is a self-clocking coding scheme in which clock and data information are encoded together into one waveform. Referring to FIG. 1, it will be noted that a DFM encoded waveform includes pulses of two widths, long and short. Pulse width is defined as the time between two transitions or edges. A long pulse is twice the width of a short pulse. DFM waveforms alternate between positive and negative pulses.

The encoding used in a DFM waveform is quite simple. A sequence of two short adjacent pulses of opposite polarity is used to represent a logical "1" (or "mark"). A long pulse of either polarity is used to represent a logical "0" (or "space"). DFM encoding may also be characterized by the edges or transitions in the encoded waveform. Thus, a transition occurs at the start of a bit cell. A logical "0" does not have any mid-cell transition, whereas a logical "1" has a mid-cell transition.

Another way of characterizing DFM encoding is that a logical "0" is encoded as a low frequency element, while a logical "1" is encoded as a high frequency element. The latter mentioned characterization provides the basis for the name double frequency modulation.

The present pulse width decoder circuit is driven by an inputted DFM waveform's rising and falling edges. Data (D) and reconstructed clock (RCLK) information are output by the decoder circuit. Basically, the present decoder circuit looks for long and short pulses. A long pulse is decoded as a logical "0", while a pair of short, opposite polarity pulses are decoded as a logical "1".

Figure 2:
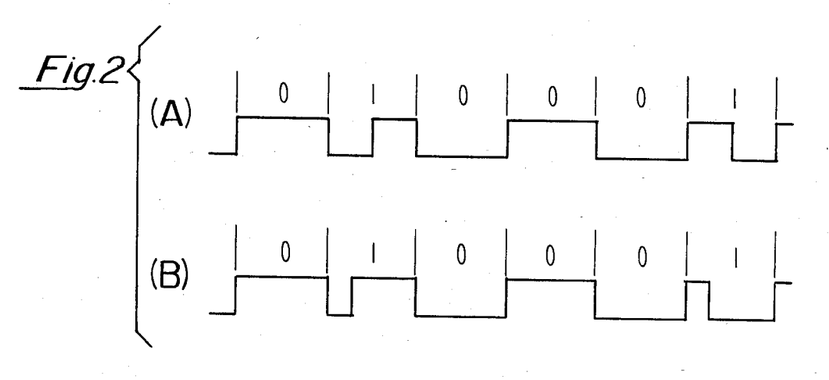
FIG. 2(A) shows a DFM waveform without pulse shortening effects.
FIG. 2(B) shows a DFM waveform exhibiting pulse shortening.

Additionally, the present decoder circuit decodes a short pulse followed by a long pulse as a logical "1". This feature of the present decoder circuit allows the circuit to tolerate pulse shortening in the DFM input waveform which may be caused by the physical characteristics of the link circuits and/or transmission medium. FIG. 2 shows two DFM waveforms, one (FIG. 2(A)) being unaffected by pulse shortening and the other (FIG. 2(B)) exhibiting pulse shortening. On wire links, saturation may cause shortening of the first short pulse of a logical "1" bit that follows the long pulse of a logical "0" bit. Although saturation will not occur in a glass fiber link, it is possible for the transducer to create similar effects. The present decoder's ability to interpret the short-long pulse sequence as a logical "1" allows the circuit to correctly decode the affected data.

Figure 3:
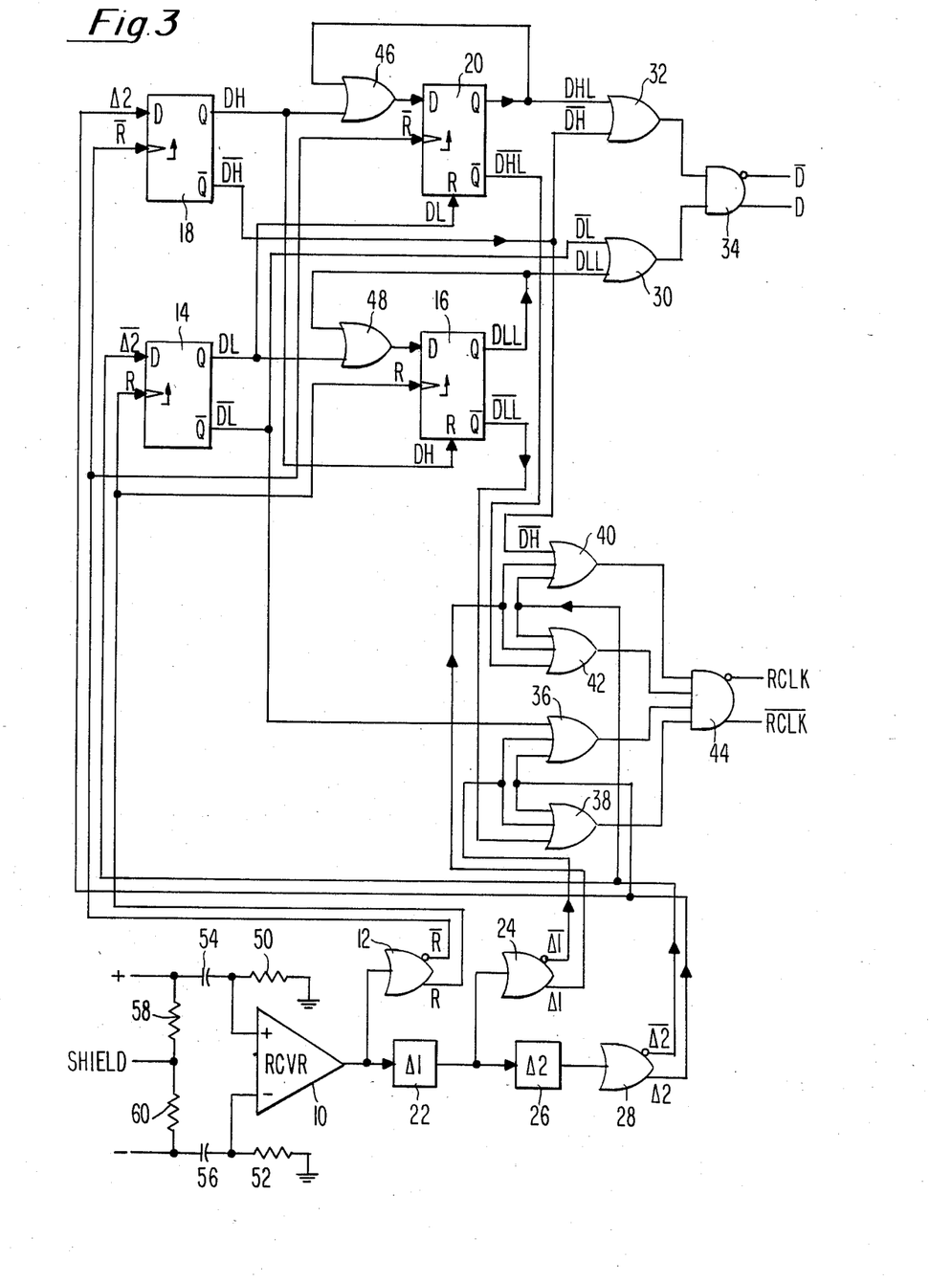
FIG. 3 shows the receiver which provides the decoder with the DFM waveform and the preferred embodiment of the decoder as implemented in ECL circuitry.

FIG. 3 shows the preferred embodiment of the present decoder circuit implemented in ECL.

The preferred embodiment of the present invention (FIG. 3) was implemented using the following components:

Flipflops 14, 16, 18, 20: Two Fairchild 100K Series ECL, F100131 Triple D Flipflops.

OR gates 30, 32 AND gate 34: One Fairchild 100K Series ECL, F100117 Triple OR/AND/INVERT gate.

OR gates 36, 38, 40, 42 AND gate 44: One Fairchild 100K Series ECL, F100118 Five Wide OR/AND-/INVERT gate.

OR gates 46, 48, 12, 24, 28: One Fairchild 100K Series ECL, F100102 Quintuple 2-Input OR/NOR gate.

Receiver 10: Advanced Micro Devices AM 685 Comparator.

Delay 22: Microcoax UT-141 Series Coaxial Cable, 3.35 ns delay, made of 27.72 inches of said cable.

Delay 26: Microcoax UT-141 Series Coaxial Cable, 3.15 ns delay, made of 26.07 inches of said cable.

Resistors 50, 52: 1 K-ohm, ½ watt, 1% each.

Capacitors 54,56: 1000 picofarads each.

Resistors 58,60: 51.1 ohm, ½ watt, 1% each.

Shielded Input Cable: Belden 9207 Twinaxial wire cable.

Those skilled in the art will appreciate that the preferred embodiment can readily be implemented in other technologies such as Schottky TTL.

The raw DFM signal enters the decoder from the output of a receiver 10. In the preferred embodiment, the receiver 10 is a high speed comparator which has its input capacitively coupled to twinax cable. Those skilled in the art will appreciate that other types of receivers and cables may be used, including fiber optic components. For purposes of this discussion, suffice it to say that the raw DFM signal is provided at the output of the receiver 10.

The raw DFM signal is fed through OR gate 12, the output of which provides inverted and non-inverted signals $\overline{R}$ and R respectively, corresponding to the raw DFM signal. The non-inverted DFM signal R clocks D-type flipflops 14, 16, and the inverted DFM signal $\overline{R}$ clocks D-type flipflops 18 and 20.

The raw DFM signal output by receiver 10 is also fed into a first delay medium 22 which delays the raw DFM by approximately one third of a bit time. The delayed signals from the first delay circuit 22 is fed through OR-gate 24 which provides inverted and non-inverted versions $\Delta 1$ and $\overline{\Delta 1}$ respectively of the first delayed DFM signal. The first delayed versions $\Delta 1$ and $\overline{\Delta 1}$ of the DFM signal are used to recover the clock from the DFM waveform.

The first delayed version $\Delta 1$ of the DFM waveform output by delay medium 22 is further delayed by delay medium 26 such that the waveform output by delay medium 26 represents the raw DFM waveform delayed by approximately three quarters of a bit time. This second delayed version of the raw DFM waveform is fed through OR gate 28 to create inverted and non-inverted versions of the second delayed DFM waveform $\Delta 2$ and $\overline{\Delta 2}$ respectively. These second delayed versions $\Delta 2$ and $\overline{\Delta 2}$ of the DFM waveform are used in the recovery of both the data and clock information from the DFM waveform.

In the preferred embodiment, delay mediums 22 and 26 consist of specific lengths of Microcoax coaxial cable, the lengths of the cable chosen to provide the desired delay time. Those skilled in the art will appreciate that alternate means may be used to achieve the desired delay of the raw DFM signal.

As previously mentioned, the present decoder looks for long pulses of either polarity. Referring to FIG. 3 and the timing diagrams shown in FIGS. 4 and 5, the DL flipflop 14 looks for negative polarity long pulses (or "double low" (DL) pulses). The DH flipflop 18 looks for positive polarity long pulses (or "double high" (DH) pulses).

Figure 4:
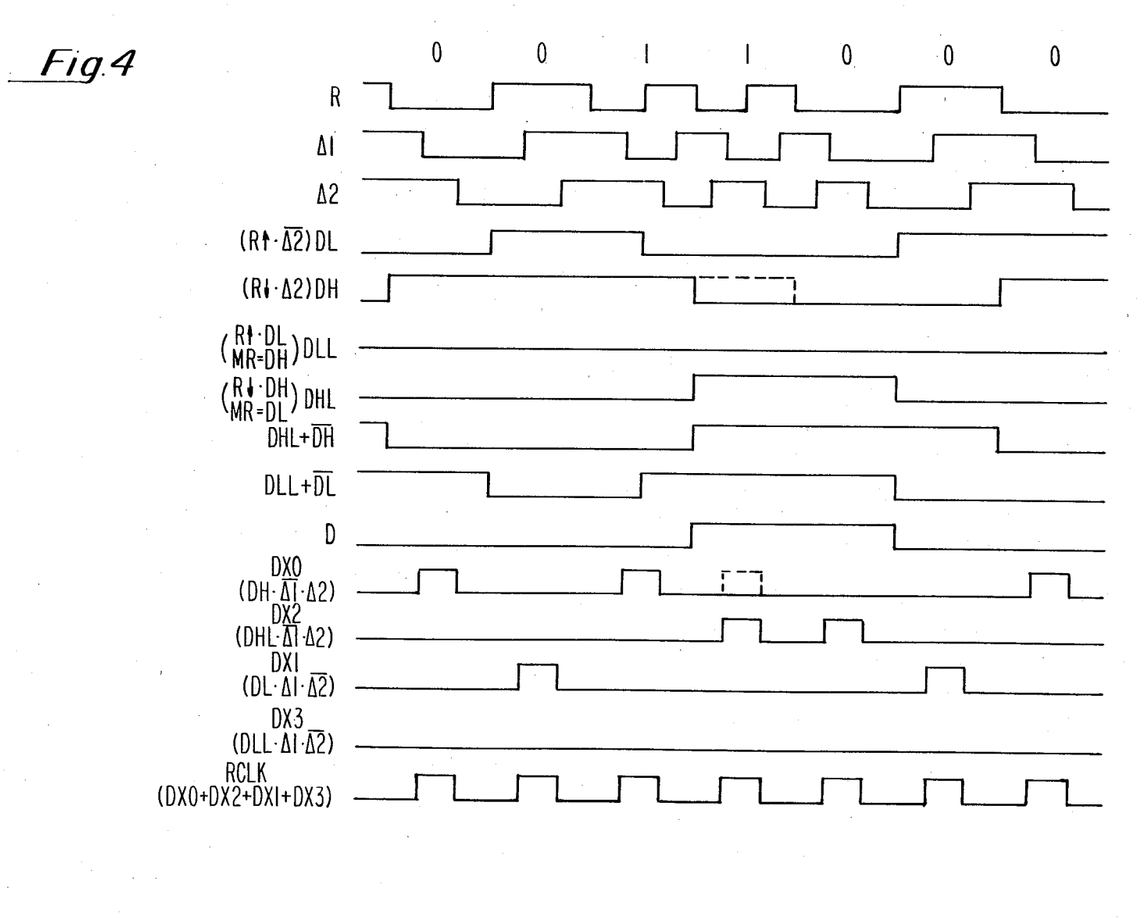
FIG. 4 is a timing diagram showing the raw DFM signals, R and $\overline{R}$, the internal decoder signals generated in response to the raw DFM signals, and the data and clock information derived by the decoder for a double high (DH) "0" bit preceding "1" bits.
Figure 5:
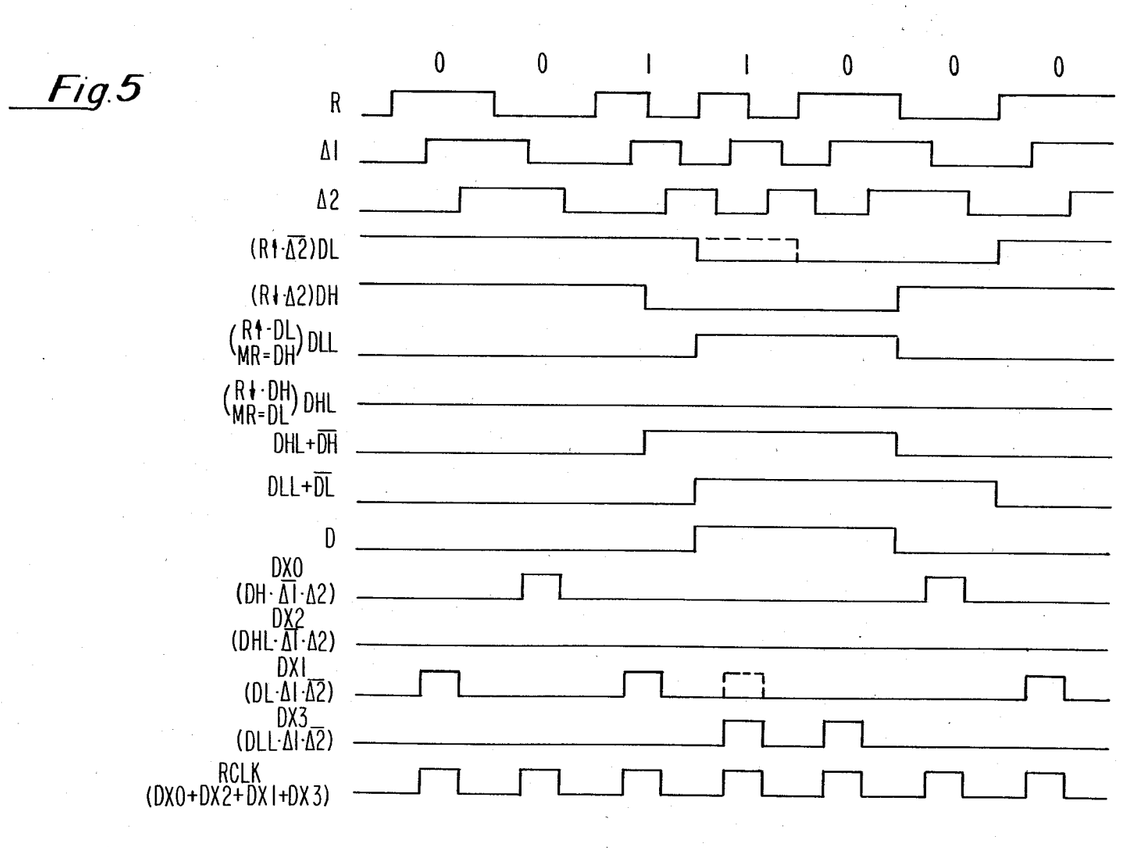
FIG. 5 is a timing diagram showing the raw DFM signals, R and $\overline{R}$, the internal decoder signals generated in response to the raw DFM signals, and the data and clock information derived by the decoder for a double low (DL) "0" bit preceding "1" bits.

The DL signal from flipflop 14 thus goes high on the rising edge of the non-inverted DFM signal R that marks the end of the DL pulse. The DL signal goes low on the rising edge of the non-inverted DFM signal R that marks the middle or end of the first logical "1" bit following the DL pulse. If pulse shortening prevents the DL signal from properly going low, the next logical "1" bit will cause the DL signal to go low.

The DH signal from flipflop 18 goes high on the falling edge of the non-inverted DFM signal R at the end of a DH pulse. The DH signal goes low on the falling edge of the non-inverted DFM signal R that marks the middle or end of the first logical "1" bit following the DH pulse. If pulse shortening prevents the DH signal from properly going low, the next logical "1" bit will cause the DH signal to go low.

The "double low last" (DLL) and "double high last" (DHL) flipflops 16 and 20, respectively, are used to remember which type of long pulse (logical "0" bit) preceded one or more pairs of short pulses (logical "1" bits). A DL pulse (from flipflop 14) preceding one or more logical "1" bits will cause the DLL flipflop 16 to be set (via OR gate 48) since a DL pulse was the last long pulse before the logical "1" bit(s). The DLL flipflop 16 remains set due to the DLL signal being fed back through OR gate 48 until it is reset by DH. Similarly, a DH pulse preceding one or more logical "1" bits will cause the DHL flipflop 20 to be set since a DH pulse was the last long pulse before the logical "1" bit(s).

The DHL signal is set (via OR gate 46) on the falling edge of R when DH is high and DL is low. DH thus acts as an asynchronous reset in this situation. The DHL flipflop 20 remains set as long as logical "1"s continue to be input to the decoder. This is accomplished by the DHL output of flipflop 20 being fed back through OR gate 46 to maintain flipflop 20 in a set condition until it is reset by DL. The DHL flipflop 20 is reset when the next logical "0" enters the decoder. DFM encoding again dictates that this logical "0" must be a DL pulse since the preceding logical "0" was a DH pulse. The DL pulse causes the DL signal to rise which resets DHL flipflop 20.

To summarize, the DLL and DHL signals indicate the polarity of the last long pulse (logical "0" bit) occurring before one or more pairs of short pulses (logical "1" bit(s)). The DLL signal indicates that the last long pulse was low. The DHL signal indicates that the last long pulse was high. If a series of logical "0" bits are input to the decoder, both the DLL and DHL signals will remain low since DL and DH will be continuously high.

When referring to the timing diagrams of FIGS. 4 and 5, note that MR is used as an abbreviation for the asynchronous master reset of flipflop 16 or 20. Thus, MR=DL means that the reset input R of DHL flipflop 20 is connected to DL.

From the timing diagrams (FIGS. 4 and 5), it can be seen that the decoder output corresponds to DLL OR'ed with DHL. However, in fact one other operation must be performed in order to complete the decoding of the data information from the DFM waveform. Thus, if the present decoder is powered up such that the DL, DH, DLL and DHL signals are all low and logical "1"s are input to the decoder, then the DL, DH, DLL and DHL signals will remain low and the decoded outputs D and $\overline{D}$ will not reflect the encoded input. To overcome this, a $(\overline{DL \cdot DH \cdot DLL \cdot DHL})$ term must be added to the calculation of D. Thus,

D=(DLL)+(DHL)+(DL·DH·DLL·DHL)

Proper minimization of the above equation yields the OR-AND term to be used to implement the decoder in ECL.

Thus,

D=(DLL+DL)·(DHL+DH)

The above equation is implemented in the present decoder by OR-gate 30 which performs an OR of DLL and $\overline{DL}$, OR gate 32 which performs an OR of DHL and $\overline{DH}$, and AND gate 34 which performs the logical AND of the outputs of OR gates 30 and 32 to provide the recovered data bit D at its output.

The clock signal RCLK is derived from the Δ1 and Δ2 delayed versions of the DFM waveform to create one clock edge every bit time. Depending on the polarity of the Δ1 and Δ2 waveforms, either (Δ1·Δ2) or (Δ1·Δ2) terms are used. Additional gating by DL, DH, DLL and DHL allow formation of clock edges at the proper time. Thus, the clock signal RCLK may be derived as follows:

RCLK=(DL·Δ1·Δ2)+(DLL·Δ1·Δ2)+(DH·Δ1·Δ2)+(DHL·Δ1·Δ2)

Converting to OR-AND forms for the ECL implementation of the preferred embodiment, we have RCLK=($\overline{DL}$+Δ1+Δ2)·($\overline{DLL}$+Δ1+Δ2)·($\overline{DH}$+Δ1+Δ2)·($\overline{DHL}$+Δ1+Δ2)

In the preferred embodiment, OR gate 36 is used to derive the term ($\overline{DL}$+Δ1+Δ2), OR GATE 38 is used to derive the term ($\overline{DLL}$+Δ1+Δ2), OR gate 40 is used to derive the term ($\overline{DH}$+Δ1+Δ2), and OR gate 42 is used to derive the term ($\overline{DHL}$+Δ1+Δ2). The outputs of OR gates 36, 38, 40 and 42 are combined in AND gate 44 to provide the recovered clock signal RCLK.

Although the preferred embodiment of the present decoder circuit is implemented in ECL, those skilled in the art will appreciate that the decoder can be implemented in any technology that provides the basic logic device requirements of: D-flipflops with asynchronous reset, "OR" gates, "AND" gates, and delay elements which allow one-third and three quarter bit time delays.

Having shown and described the preferred embodiment of the present invention, we state that the subject matter which we regard as being our invention is particularly pointed out and distinctly claimed in the following claims. Those skilled in the art to which the present invention pertains will appreciate that equivalents or modifications of, or substitutions for, parts of the specifically described embodiment of the invention may be made without departing from the scope of the invention as set forth in what is claimed.

What is claimed is:

1. A decoder circuit for deriving data and clock information from an inputted double frequency encoded waveform, comprising:

delay means, receiving said inputted waveform, for producing first and second delayed versions of said inputted waveform:

data recovery means, receiving the second delayed version of said inputted waveform, for recovering the data information from said inputted waveform; and clock recovery means, receiving the first and second delayed versions of said inputted waveform and responsive to said data recovery means, for recovering the clock information from said inputted waveform.

2. The decoder circuit in accordance with claim 1 wherein said data recovery means is further responsive to said inputted waveform.

3. A decoder circuit for deriving data and clock information from an inputted double frequency encoded waveform, comprising:

delay means, receiving said inputted waveform, for producing delayed versions of said inputted waveform;

data recovery means, responsive to said delay means, for recovering the data information from said inputted waveform, said data recovering means including DL means, responsive to said delay means, for detecting the occurrence of a double low (DL) pulse in said inputted waveform, DH means, responsive to said delay means, for detecting the occurrence of a double high (DH) pulse in said inputted waveform.

DLL means, responsive to said DL means, said DH means and said inputted waveform, for remembering whether a DL pulse preceded a pair of short pulses, and DHL means, responsive to said DH means, said DL means and said inputted waveform, for remembering whether a DH pulse preceded a pair of short pulses; and clock recovery means, responsive to said delay means and said data recovery means, for recovering the clock information from said inputted waveform.

4. The decoder circuit in accordance with claim 3 wherein said data recovery means is further responsive to said inputted waveform.

5. The decoder circuit in accordance with claim 3 wherein said delay means includes means for producing first and second delayed versions of said inputted waveform.

6. The decoder circuit according to claims 1 or 2 or 3, or 4 or 5, wherein:

said first delayed version of said inputted waveform corresponds to the inputted waveform delayed by approximately one third of a bit time; and said second delayed version of said inputted waveform corresponds to the inputted waveform delayed by approximately three quarters of said bit time.

7. The decoder circuit according to claims 1 or 2 or 5, wherein said data recovery means includes:

DL means, responsive to said delay means, for detecting the occurrence of a double low (DL) pulse in said inputted waveform;

DH means, responsive to said delay means, for detecting the occurrence of a double high (DH) pulse in said inputted waveform;

DLL means, responsive to said DL means, said DH means and said inputted waveform, for remembering whether a DL pulse preceded a pair of short pulses; and DHL means, responsive to said DH means, said DL means and said inputted waveform, for remembering whether a DH pulse preceded a pair of short pulses.

8. The decoder circuit in accordance with claim 7 wherein said data recovery means is further responsive to said inputted waveform.

9. The decoder circuit in accordance with claim 7 wherein:

said DL means and said DH means each includes a D-type flipflop;

the flipflop included in said DH means receives as its D input the second delayed version of said inputted waveform and receives as its clock input the inverse of the inputted waveform; and the flipflop included in said DL means receives as its D input the inverse of the second delayed version of said inputted waveform and receives as its clock input the inputted waveform.

10. The decoder circuit in accordance with claim 9 wherein:

said DHL means and said DLL means each includes a D-type flipflop with an asynchronous reset;

the flipflop included in said DHL means receives as its D input a signal responsive to the Q output of the flipflop included in said DH means, receives as its clock input the inverse of the inputted waveform, and receives as its reset input the Q output of the flipflop included in said DL means; and the flipflop included in said DLL means receives as its D input a signal responsive to the Q output of the flipflop included in said DL means, receives as its clock input the inputted waveform, and receives as its reset input the Q output of the flipflop included in said DH means.

11. The decoder circuit in accordance with claim 10 wherein:

the D input to the flipflop included in said DHL means is further responsive to the Q output of said latter mentioned flipflop; and the D input to the flipflop included in said DLL means is further responsive to the Q output of said latter mentioned flipflop.

12. The decoder circuit in accordance with claim 11 wherein said data recovery means further includes:

a first logical OR gate responsive to the Q output of the flipflop included in said DHL means and the $\overline{Q}$ output of the flipflop included in said DH means;

a second logical OR gate responsive to the Q output of the flipflop included in said DLL means and the $\overline{Q}$ output of the flipflop included in said DL means; and a first logical AND gate responsive to the output of said first and second logical OR gates, the output of said first logical AND gate providing recovered data information.

13. The decoder circuit in accordance with claim 12 wherein said data recovery means further includes:

a third logical OR gate receiving as its inputs the Q outputs of each of the flipflops included in said DH means and said DHL means, the output of said third logical OR gate providing the D input to the flipflop included in said DHL means; and a fourth logical OR gate receiving as its inputs the Q outputs of each of the flipflops included in said DL means and said DLL means, the output of said fourth logical OR gate providing the D input to the flipflop included in said DLL means.

14. The decoder circuit in accordance with claim 10 wherein said clock recovery means includes:

fifth and sixth logical OR gates, each receiving as inputs the first delayed version of said inputted waveform and the inverse of the second delayed version of said inputted waveform, said fifth logical OR gate receiving as a third input the $\overline{Q}$ output of the flipflop included in said DH means, said sixth logical OR gate receiving as a third input the $\overline{Q}$ output of the flipflop included in said DHL means;

seventh and an eighth logical OR gates, each receiving as inputs the second delayed version of the inputted waveform and the inverse of the first delayed version of the inputted waveform, said seventh logical OR gate receiving as as a third input the $\overline{Q}$ output of the flipflop included in said DL means, said eighth logical OR gate receiving as a third input the $\overline{Q}$ output of the flipflop included in said DLL means; and a second logical AND gate receiving as its inputs the outputs of said fifth, sixth, seventh and eighth logical OR gates, the output of said second logical AND gate providing said clock information.

15. The decoder circuit in accordance with claim 10 wherein each of said first, second, third and fourth flipflops is triggered by a rising edge.

16. The decoder circuit according to claims 1 or 2 or 3 or 4 or 5, wherein said delay means includes a plurality of sections of microcoax coaxial cable.

17. The decoder circuit according to claims 1 or 2 or 3 or 4 or 5, wherein said decoder circuit receives said inputted waveform from the output of a receiver, said receiver including a high speed comparator which has its inputs capacitively coupled to a twinax cable.

18. The decoder circuit in accordance with claim 17 wherein said delay means further includes:

a first logical OR/NOR gate, responsive to the output of said receiver, the outputs of said first logical OR/NOR gate providing inverted and noninverted versions of said inputted waveform;

a second logical OR/NOR gate, responsive to the first delayed version of said inputted waveform, the outputs of said second logical OR/NOR gate providing inverted and noninverted versions of the first delayed version of said inputted waveform; and a third logical OR/NOR gate, responsive to the second delayed version of said inputted waveform, the outputs of said third logical OR/NOR gate providing inverted and non-inverted versions of the second delayed version of said inputted waveform.

* * * * *

UNITED STATES PATENT AND TRADEMARK OFFICE
CERTIFICATE OF CORRECTION

PATENT NO. : 4,547,764
DATED : October 15, 1985
INVENTOR(S) : Bernardo Levy-Navarro & Ensi P. Sylvernale It is certified that error appears in the above-identified patent and that said Letters Patent is hereby corrected as shown below:

Col. 5, line 61, change "$\Delta 1$", first occurrence, to --$\overline{\Delta 1}$--.

Col. 5, line 62, change "$\Delta 1$", first occurrence to --$\overline{\Delta 1}$--.

Col. 6, line 4, change "$\Delta 2$" to --$\overline{\Delta 2}$--.

Col. 6, line 5, change "$\Delta 2$", second occurrence, to --$\overline{\Delta 2}$--.

Col. 7, line 24, change "(DL.DH.DLL.DHL)" to --($\overline{DL}.\overline{DH}.\overline{DLL}.\overline{DHL}$)--.

Col. 7, line 31, change "DL" to --$\overline{DL}$--.

Col. 7, line 31, change "DH" to --$\overline{DH}$--.

Col. 7, line 42, change "($\Delta 1.\Delta 2$)" to --($\overline{\Delta 1}.\Delta 2$)--.

Col. 7, line 43, change "($\Delta 1.\Delta 2$)" to --($\Delta 1.\overline{\Delta 2}$).

Col. 7, rewrite lines 48-49 as:
--RCLK = ($\overline{DL}.\Delta 1.\overline{\Delta 2}$) + ($DLL.\Delta 1.\overline{\Delta 2}$) + ($DH.\overline{\Delta 1}.\Delta 2$) + ($DHL.\overline{\Delta 1}.\Delta 2$)--.

Col. 7, rewrite lines 54-55 as:
--RCLK = ($\overline{DL} + \overline{\Delta 1} + \Delta 2$) . ($\overline{DLL} + \overline{\Delta 1} + \Delta 2$) . ($\overline{DH} + \Delta 1 + \overline{\Delta 2}$) . ($\overline{DHL} + \Delta 1 + \overline{\Delta 2}$)--.

UNITED STATES PATENT AND TRADEMARK OFFICE
CERTIFICATE OF CORRECTION

PATENT NO. : 4,547,764
DATED : October 15, 1985
INVENTOR(S) : Bernardo Levy-Navarro & Ensi P. Sylvernale It is certified that error appears in the above-identified patent and that said Letters Patent is hereby corrected as shown below:

Col. 7, line 58, change "$(\overline{DL} + \Delta 1 + \Delta 2)$" to --$(\overline{DL} + \overline{\Delta 1} + \Delta 2)$--.

Col. 7, line 59, change "$(\overline{DLL} + \Delta 1 + \Delta 2)$" to --$(\overline{DLL} + \overline{\Delta 1} + \Delta 2)$--.

Col. 7, line 60, change "$(\overline{DH} + \Delta 1 + \Delta 2)$" to --$(\overline{DH} + \Delta 1 + \overline{\Delta 2})$--.

Col. 7, line 61, change "$(\overline{DHL} + \Delta 1 + \Delta 2)$" to --$(\overline{DHL} + \Delta 1 + \overline{\Delta 2})$--.

Signed and Sealed this

Twenty-eighth Day of January 1986

[SEAL]

Attest:

DONALD J. QUIGG

Attesting Officer

Commissioner of Patents and Trademarks